No. 691,612. Patented Jan. 21, 1902.
H. DODS.
MACHINE FOR CUTTING MATERIAL INTO STRIPS FOR THE MANUFACTURE OF PISTON PACKING.
(Application filed July 21, 1897.)
(No Model.) 2 Sheets—Sheet 1.
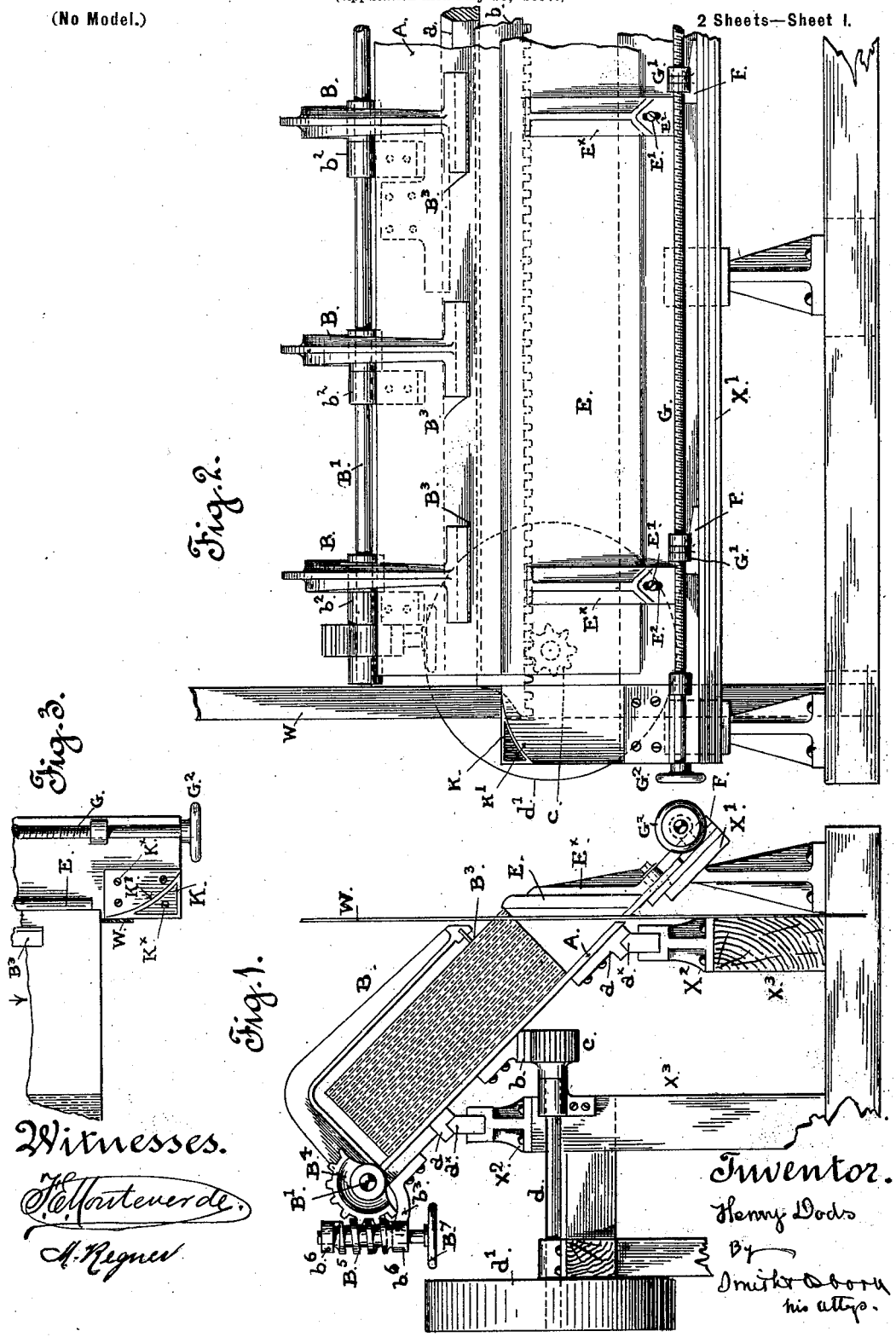

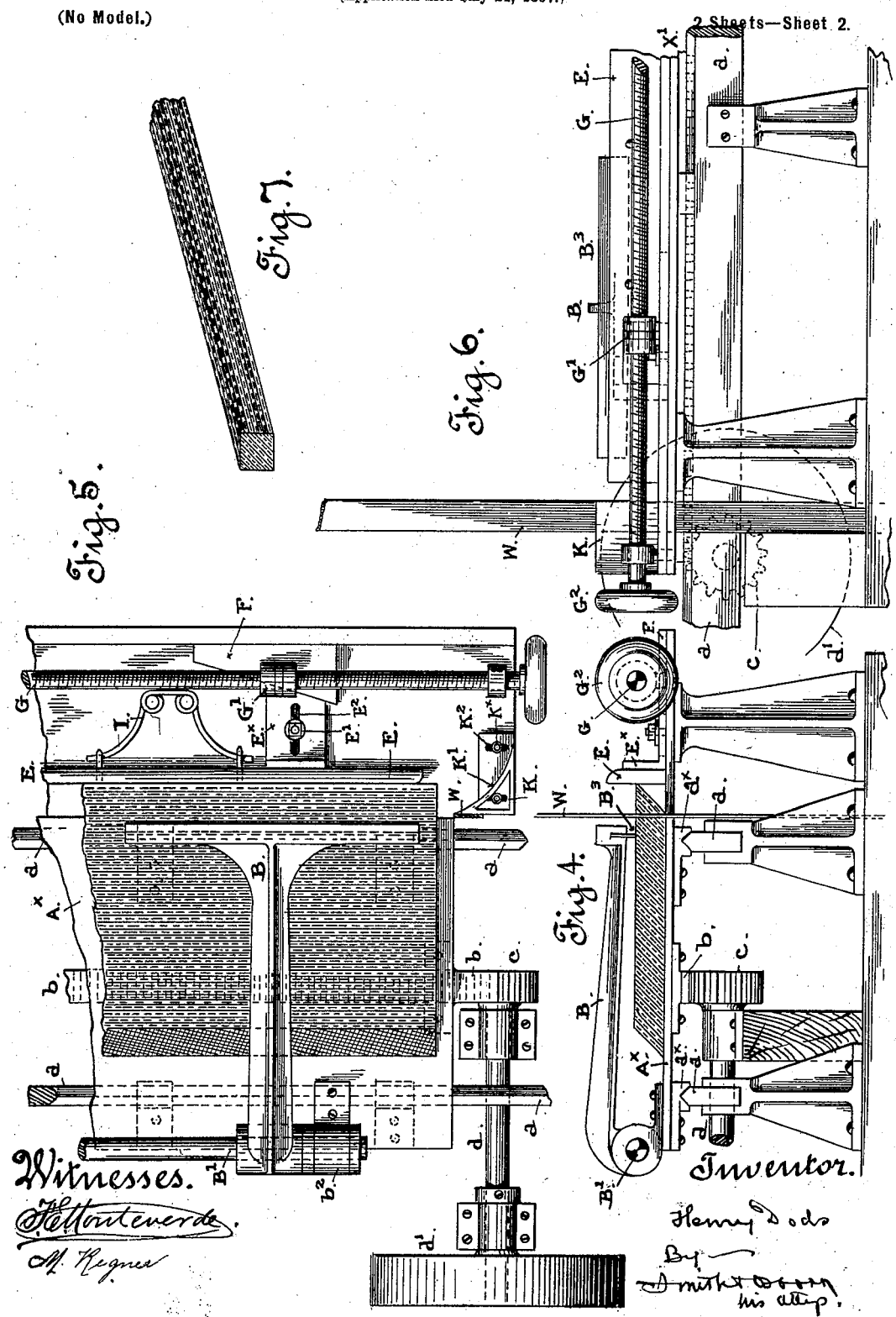

UNITED STATES PATENT OFFICE.

HENRY DODS, OF VIRGINIA CITY, NEVADA.

MACHINE FOR CUTTING MATERIAL INTO STRIPS FOR THE MANUFACTURE OF PISTON-PACKING.

SPECIFICATION forming part of Letters Patent No. 691,612, dated January 21, 1902.

Application filed July 21, 1897. Serial No. 645,460. (No model.)

*To all whom it may concern:*

Be it known that I, HENRY DODS, a citizen of the United States, residing in Virginia City, Storey county, State of Nevada, have invented certain new and useful Improvements in Machines for Cutting Material into Strips for the Manufacture of Piston-Packing, of which the following is a specification.

This invention relates to machines for cutting from a block or cake of material strips of definite breadth and thickness with parallel faces for the manufacture of piston-packing; and the said invention consists in certain novel parts and combination of parts producing an improved cutting-machine and one that is particularly adapted to cut strips of uniform breadth and thickness and of any desired dimensions from a solid block or cake of material, as hereinafter fully explained, and pointed out in the claim at the end of this specification.

The essential or material points and features of my improved cutting-machine comprise a bed or table to support the work, mechanism for feeding or advancing said table toward and past a cutting-blade, a clamp for confining on the table the block or cake of material to be cut into strips, an adjustable stationary gage for regulating the width or thickness of the strip to be cut from the material on the bed, and a guide for carrying the cut strips away from the cutting-blade as it is severed from the block of material.

In one form of my improved machine a traveling bed or table is supported and arranged to travel in a slanting position with a downward inclination with respect to the cutting-blade, which runs vertically with a continuous rectilinear motion, whereby the block is so presented and fed to the cutter that the strips are cut diagonally or on slanting lines with respect to the top and bottom faces of the block. In another form of the machine the bed or table is set horizontally, so that the material is presented to and cut by the blade on vertical lines. The same parts enter into the construction of both machines, however, and are similarly arranged for operation.

The nature of the said improvement and the manner in which the same is constructed and combined for operation are fully explained in the following description, in which reference is had to the drawings that accompany and form part of this specification.

In the said drawings, Figures 1 to 3, inclusive, illustrate that form of the machine in which the table is set at an angle with relation to the cutter, Fig. 1 being an end elevation, Fig. 2 a front elevation of one-half of the machine, and Fig. 3 a plan or top view of the slanting guide at the left-hand end of the machine. Figs. 4, 5, and 6 illustrate the form of the machine in which the bed is horizontal, Fig. 4 showing an elevation of the machine taken from the front end, Fig. 5 a plan or top view of the front end with the opposite end broken away, Fig. 6 a side elevation taken from the left-hand side of Fig. 4, and Fig. 7 a perspective view of the packing-strip.

A indicates the traveling table or bed, on which the material to be cut into strips is clamped. This table is mounted on grooved ways $a$ $a^x$ to slide smoothly and is moved along by a rack $b$, fixed to the under side of the table, and a pinion $c$ on a shaft $d$. A pulley $d'$ on the shaft $d$ takes a belt from some convenient driver, such as a pulley on a line of shafting above, or from the driving-gear of the cutter employed.

B B indicate hinged clamping-arms attached to the rear end of the table and arranged to be turned down upon the block of material when the same is placed on the table. These clamps are raised after a strip has been cut in order to release the block of material and allow it to be moved forward to the line of the cutting-blade the desired distance for the next cut, and after such adjustment of the block the clamps are brought down again to hold the block during the cutting operation.

E indicates an adjustable gage supported by a stationary frame or bench X' along the front edge of the traveling table and capable of adjustment mechanically toward and away from the vertical plane in which the cutting-blade W works.

The form or style of cutter which I prefer to use in my machine is an endless flexible band of steel, supported and driven with a rapid movement continuously in one direction, like an endless-band saw, by means of carrying-wheels mounted in a frame one above the other and to one of which power is applied to run the wheels in the required direction. The cutting means therefore is identical in its general construction with an ordinary endless-band sawing-machine, excepting that an endless blade with a continuous sharp beveled cutting edge is substituted for the endless band with saw-teeth on its edge. The working gear from an ordinary endless-band sawing-machine can be employed to advantage by substituting a cutting-band with a continuous beveled cutting edge in place of the saw-band and setting the same in working position with the table and gages. In place of such cutting means being employed, however, the operation of cutting could be performed by a cutting-blade driven with a rapid reciprocating motion. The position occupied by the cutter is represented at W in Figs. 1, 2, 4, and 6, with the front edge of the table sitting closely to the line of the blade to properly support the material being cut, and yet with sufficient clearance to prevent rubbing contact of the blade. Thus the cutter W works between the front edge of the traveling table on one side and the stationary gage on the other both in the construction represented in Figs. 1 to 3, inclusive, in which the table A is inclined, and in the other arrangement shown in Figs. 4 to 6, inclusive, where the table $A^\times$ is horizontal. In either case the table is moved along with continuous motion, carrying the block of material against the cutter with an even pressure. These two forms of the machine are provided for use together in the manufacture of a piston-rod packing of rectangular shape in cross-section and of desired length from a thick cake or block of material composed of alternate layers of canvas and rubber, and in such manufacture the block of material is first clamped to the inclined-table machine and is divided on slanting lines into sheets or strips of uniform thickness, and afterward these strips are clamped in the horizontal-table machine and cut into strips of rectangular shape in cross-section by vertical and parallel lines of cut, so that the resulting strip has the form represented in Fig. 7 of the drawings.

The construction and operation of the work-holding clamps B will be understood from Figs. 1, 2, 4, and 5 of the drawings.

The arms B are fast on a rocking shaft B', for which supports are provided in brackets $b^2$ on the back end of the table, so that by turning the shaft or by raising or dropping one arm all the others will be moved accordingly. On the outer end of each arm is a thin blade $B^3$, with a serrated bottom edge, rigidly fixed in a slot in the arm in position to bring the blade perpendicular to the top face of the block of material. The teeth or serrations of the thin edge will be pressed into the soft or yielding surface of the block to a sufficient degree to hold the block from moving either longitudinally or transversely on the bed. When combined with the horizontally-set table, the weight of the arms is relied on to press the blades $B^3$ into the material to a sufficient degree to hold the block stationary; but in the case of the inclined-table machine the clamps will be found to require additional pressure to be given to them to hold the block from slipping upon the inclined surface, and for that purpose I fix on the front end of the rocking shaft B' a sector-gear $B^4$, and on the same end of the table I arrange an upright screw or worm $B^5$ on the short shaft to mesh with the gear $B^4$. Bearings $b^6$ $b^6$ for this worm-shaft are provided on the bracket $b^3$ on the table, and a hand-wheel $B^7$ is fixed on the end of the shaft for turning it. All the arms B are thus raised at the same time by turning the hand-wheel in one direction, and the whole set is likewise brought down upon the block of material by a contrary movement of the hand-wheel. Such amount of pressure as the arms B are required to exert against the top face of the block is given through this hand-wheel and the worm and sector to hold the arms after adjustment in whatever position they may be set. It should be mentioned that while the worm-shaft and sector are not found necessary on the horizontal-table machine and may be dispensed with they can be provided on that table for raising and lowering the arms B, if it is so desired.

The construction of the gage E is the same in the two different arrangements of the work holding and feeding table shown in the drawings. The angle-plates $E^\times$ are attached to the bench or stationary support X' by screw-studs E' and slots $E^2$ in the foot of the angle-plate to slide forward and backward. The end of the foot is cut on an angle to rest against the inclined face of a wedge-shaped block F, that is fitted to slide on the surface of the bench X', the longitudinal movement of the wedges being made to set the gage toward the plane of the cutting-blade. The length of movement of the wedges determines the thickness of the strip that will be cut from the block, and the same is produced by a screw-shaft G and a nut G', fast on the top of each gage. A hand-wheel $G^2$ to turn the shaft is provided on the front end. This adjusting mechanism is the same in both forms of the machine, excepting that a wire spring I is applied to the gage-board E for the horizontal-table machine to hold the wedge-shaped ends of the angle-plates against the face of the sliding wedge-block, whereas in the case of the slanting table the weight of the gage-board and its angle-plates will be found to hold the angular ends of the plates in working position against the wedge-blocks without the spring.

On the front end of the bench, in close relation to the cutting-blade W, is secured a curved guide-plate K, the function of which is to carry the cut strip away from the cutting-blade as the table is fed up to the cutter. This piece K is attached to the bench by bolts K×, setting through slots in the plates, so as to allow for its adjustment. One face of the piece is flat, and the other, K', meeting it at an acute angle, is struck on a curve of about a quarter-circle, so that when the acute edge of the piece is placed in line with the cut the curved face will guide the strip away from the cutter and turn it to the side. The position of this guide with respect to the cutting-blade and the block clamped on the table is shown in Figs. 3, 5, and 6 of the drawings.

As the traveling table requires to be supported for the entire length of its movement past the cutting-blade the stationary rails $a\ a$ should extend behind the cutter or on the side opposite to that occupied by the table in the drawings a sufficient distance to support the table. The stationary supports $X^2\ X^2$ are placed at intervals apart on the bed-timbers $X^3$ to support the rails.

Having thus fully described my invention, what I claim as new, and desire to secure by Letters Patent, is—

In a machine for cutting material into strips, the combination with a traveling table adapted to feed and present the material to the cutting mechanism, of means for clamping the material on the table comprising a rock-shaft supported in bearings on the table, arms fast on the rock-shaft extending over the table above the material and provided with clamping-blades on their ends and means for turning the rock-shaft to raise and lower the arms.

In testimony that I claim the foregoing I have hereunto set my hand and seal.

HENRY DODS. [L. S.]

Witnesses:
EDWARD E. OSBORN,
C. W. M. SMITH.